United States Patent
Woodward

(10) Patent No.: US 10,335,886 B1
(45) Date of Patent: Jul. 2, 2019

(54) VIBRATING WELDING SYSTEM

(71) Applicant: William A. Woodward, Old Bridge, NJ (US)

(72) Inventor: William A. Woodward, Old Bridge, NJ (US)

( * ) Notice: Subject to any disclaimer, the term of this patent is extended or adjusted under 35 U.S.C. 154(b) by 337 days.

(21) Appl. No.: 15/204,568

(22) Filed: Jul. 7, 2016

Related U.S. Application Data

(60) Provisional application No. 62/189,424, filed on Jul. 7, 2015.

(51) Int. Cl.
*B23K 9/30* (2006.01)
*B23K 9/167* (2006.01)

(52) U.S. Cl.
CPC .............. *B23K 9/30* (2013.01); *B23K 9/167* (2013.01)

(58) Field of Classification Search
CPC .................................. B23K 9/30; B23K 9/167
See application file for complete search history.

(56) References Cited

U.S. PATENT DOCUMENTS

| | | | |
|---|---|---|---|
| 3,182,178 A * | 5/1965 | Libby | B23K 9/09 219/75 |
| 4,531,040 A | 7/1985 | Nawa et al. | |
| 6,273,980 B1 | 8/2001 | Akiyama et al. | |
| 8,408,445 B1 | 4/2013 | Cai et al. | |
| 8,409,383 B1 | 4/2013 | Tan et al. | |
| 2006/0011700 A1 | 1/2006 | Trabandt et al. | |
| 2006/0124603 A1 | 6/2006 | Kitamura et al. | |
| 2012/0006810 A1 | 1/2012 | Fan et al. | |
| 2013/0327755 A1* | 12/2013 | Weiss | B23K 9/0216 219/138 |

FOREIGN PATENT DOCUMENTS

CN    102554417 A    7/2012

\* cited by examiner

*Primary Examiner* — Geoffrey S Evans
(74) *Attorney, Agent, or Firm* — Cramer Patent & Design, PLLC; Aaron R. Cramer

(57) ABSTRACT

A vibrating welding torch attachment utilizes a battery-operated vibrating mechanism secured within a cylindrical housing. The attachment is configured to be detachably secured to the welding end of a traditional TIG-style welding torch. The battery pack within the attachment is rechargeable.

20 Claims, 5 Drawing Sheets

VIBRATING WELDING SYSTEM

RELATED APPLICATIONS

This application claims the benefit of U.S. Provisional Application No. 62/189,424, which was filed Jul. 7, 2015, the entire disclosures of which are incorporated herein by reference.

FIELD OF THE INVENTION

The presently disclosed subject matter relates to tungsten inert gas (TIG) welding. More particularly the present invention relates to a vibrating TIG welding torch and system.

BACKGROUND OF THE INVENTION

Tungsten inert gas (TIG) welding is an arc welding process that uses a non-consumable tungsten electrode to produce a metal weld. Generally, a TIG weld area is protected from atmospheric contamination using an inert shielding gas (usually argon or helium) and a joint filling metal. The shielding gases protect the welding area from atmospheric gases such as nitrogen and oxygen which may cause fusion defects, porosity, and weld metal embrittlement. The shielding gas may also transfer heat from the tungsten electrode to the metal, while maintaining a stable arc.

To weld a constant-current welding power supply produces electrical energy that is conducted across a plasma arc composed of a column of highly ionized gas and metal vapors. Negatively charged electrodes generate heat by emitting electrons which travel across the plasma arc causing thermal ionization of the shielding gas and increasing the temperature of the base material. By moving the plasma arc along a desired trajectory a TIG welder can have better control over a weld than when using competing processes such as shielded metal arc welding and gas metal arc welding.

TIG welding has proven itself to be a highly advantageous welding process when used by a skilled welder. A typical TIG welding system includes a welding torch, a cooling system, the constant-current power supply, the inert gas, and a delivery system for the inert gas. TIG welding torches can be designed for either automatic or manual welding operations. Both torches are similar in construction and operation but a manual torch has a handle while an automatic torch normally attaches to a mounting rack. One (1) advantage of the manual TIG torch is that the head angle, the angle between the center-line of the handle and the center-line of the tungsten electrode, may be varied to suit the preferences and skills of the welder.

A TIG welding electrode may include alloys of copper or brass to improve the transmission of current and heat. But the main part of the electrode is the tungsten which is fixed along the center of the TIG torch. The welder initiates a plasma arc by briefly touching a work area that is connected to the constant current source and then moves the plasma arc via the electrode along a desired trajectory to make a weld. Ports around the tungsten electrode provide an avenue for the flow of shielding gas. In practice a plurality of heat-resistant torch gas nozzles of different sizes may be made available to accommodate the required area to be protected by the external gas shield. Hand-operated switches are used to control the welding current. The TIG torch body is almost always made of a heat-resistant and insulating material to protect the operator.

While TIG welding has proven to be extremely useful the inventor has found a process which improves on existing TIG welders. The process can not only improve TIG welding but it can be implemented in a straightforward manner and can be with little to no additional learning required by the welder.

SUMMARY OF THE INVENTION

Tungsten inert gas (TIG) welding is an arc welding process that uses a non-consumable tungsten electrode to produce a metal weld. Generally, a TIG weld area is protected from atmospheric contamination using an inert shielding gas (usually argon or helium) and a joint filling metal. The shielding gases protect the welding area from atmospheric gases such as nitrogen and oxygen which may cause fusion defects, porosity, and weld metal embrittlement. The shielding gas may also transfer heat from the tungsten electrode to the metal, while maintaining a stable arc.

To weld a constant-current welding power supply produces electrical energy that is conducted across a plasma arc composed of a column of highly ionized gas and metal vapors. Negatively charged electrodes generate heat by emitting electrons which travel across the plasma arc causing thermal ionization of the shielding gas and increasing the temperature of the base material. By moving the plasma arc along a desired trajectory a TIG welder can have better control over a weld than when using competing processes such as shielded metal arc welding and gas metal arc welding.

TIG welding has proven itself to be a highly advantageous welding process when used by a skilled welder. A typical TIG welding system includes a welding torch, a cooling system, the constant-current power supply, the inert gas, and a delivery system for the inert gas. TIG welding torches can be designed for either automatic or manual welding operations. Both torches are similar in construction and operation but a manual torch has a handle while an automatic torch normally attaches to a mounting rack. One (1) advantage of the manual TIG torch is that the head angle, the angle between the center-line of the handle and the center-line of the tungsten electrode, may be varied to suit the preferences and skills of the welder.

A TIG welding electrode may include alloys of copper or brass to improve the transmission of current and heat. But the main part of the electrode is the tungsten which is fixed along the center of the TIG torch. The welder initiates a plasma arc by briefly touching a work area that is connected to the constant current source and then moves the plasma arc via the electrode along a desired trajectory to make a weld. Ports around the tungsten electrode provide an avenue for the flow of shielding gas. In practice a plurality of heat-resistant torch gas nozzles of different sizes may be made available to accommodate the required area to be protected by the external gas shield. Hand-operated switches are used to control the welding current. The TIG torch body is almost always made of a heat-resistant and insulating material to protect the operator.

While TIG welding has proven to be extremely useful the inventor has found a process which improves on existing TIG welders. The process can not only improve TIG welding but it can be implemented in a straightforward manner and can be with little to no additional learning required by the welder.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
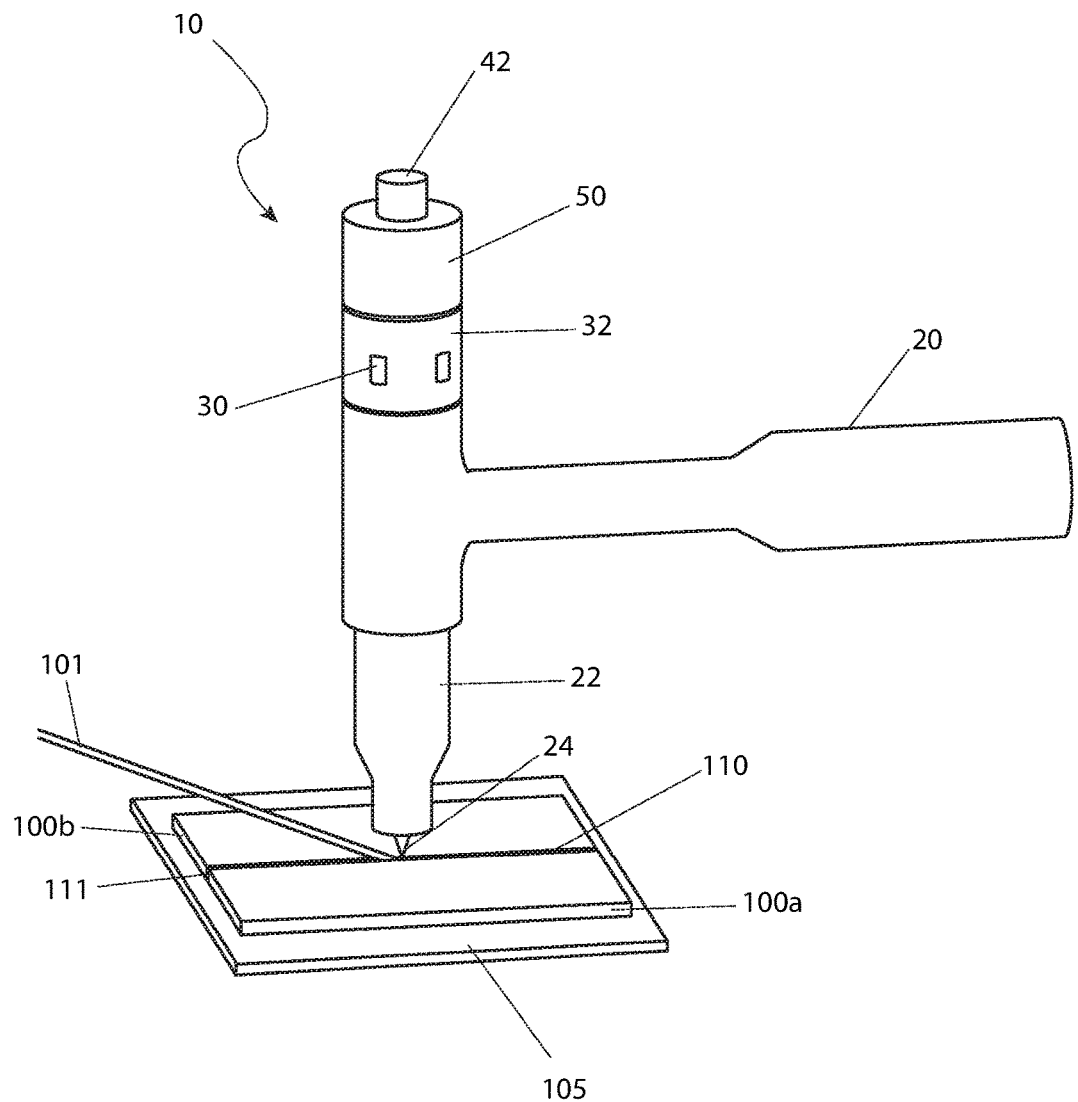
FIG. 1 is an environmental perspective view of a vibration welding system 10 that is in accord with the present invention.

DESCRIPTIVE KEY 10 vibration welding system
20 torch body
22 welding head
24 tungsten electrode
30 recharging strip
32 battery receptacle
33 power cord
35 recharging receptacle
38 recharging station
40 battery
41 button enclosure
42 stem
45 power switch
46 motor housing
50 vibration unit
51 DC motor with offset counterweight
60 transformer
65 rectifying bridge
70 filter capacitor
75 charge regulator(s)
80 output contacts
100a first workpiece
100b second workpiece
101 filler rod
105 base material
110 weld
111 seam

DETAILED DESCRIPTION OF THE PREFERRED EMBODIMENT

The preferred embodiment of the present invention is depicted in FIGS. 1-5. However, the invention is not limited to the specifically described and illustrated embodiment. A person skilled in the art will appreciate that many other embodiments of the invention are possible without deviating from the basic concept of the invention and that any such work around will also fall under the scope of this invention.

In the figures like numbers refer to like elements throughout. Additionally, the terms "a" and "an" as used herein do not denote a limitation of quantity, but rather denote the presence of at least one (1) of the referenced items.

Refer now to FIG. 1 for an overall view of a vibration welding system 10 that is in accord with a preferred embodiment of the present invention. The vibration welding system 10 includes a tungsten inert gas (TIG) welding torch body 20, a welding head 22 holding a tungsten electrode 24, and a vibration unit 50 which imparts vibrating motion to the tungsten electrode 24.

Figure 4:
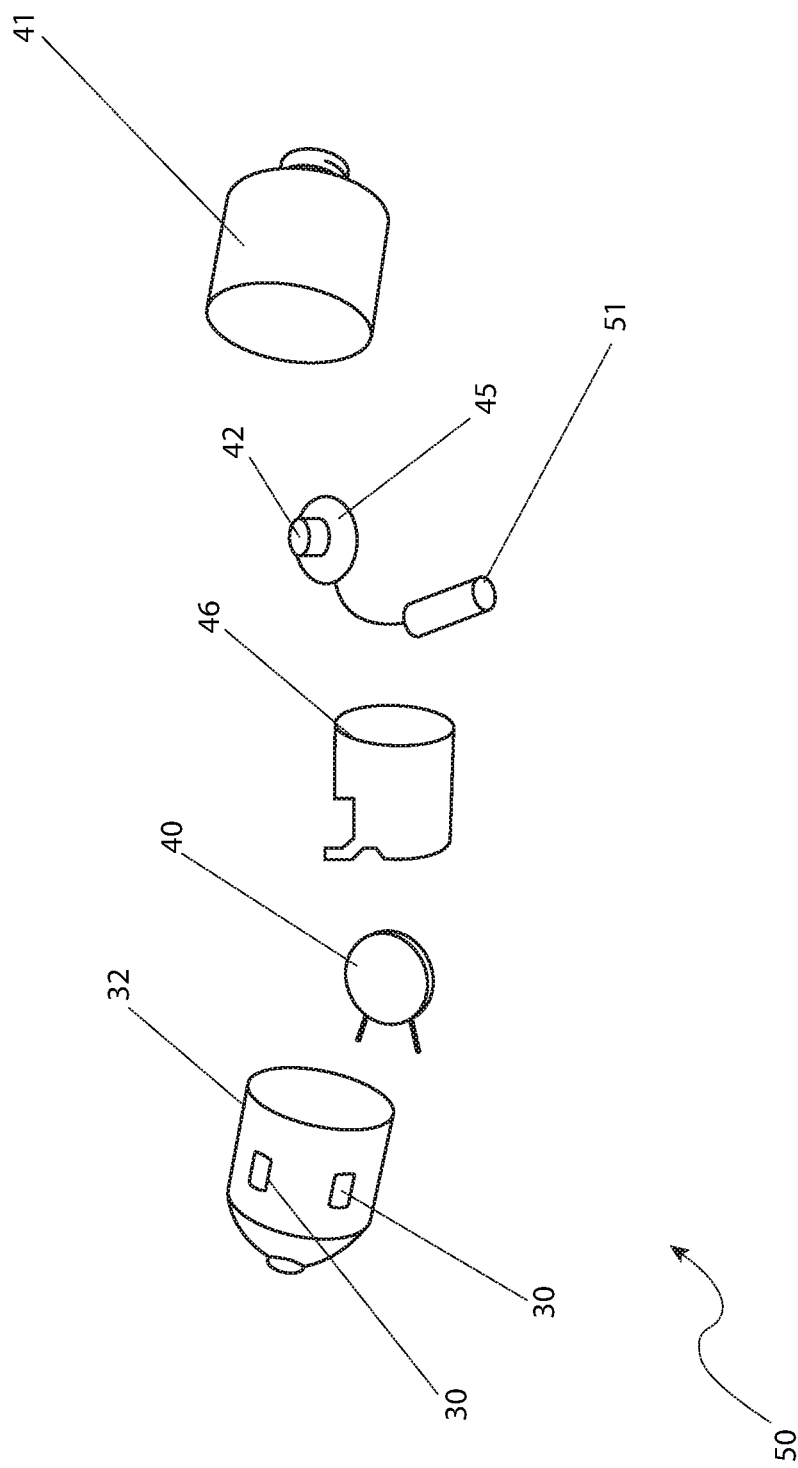
FIG. 4 is an exploded perspective view of individual components of the vibration unit 50 used with the vibration welding system 10; and, FIG. 5 is a functional electrical block diagram of the vibration welding system 10 shown in FIG. 1.

FIG. 4 shows an exploded view of the vibration unit 50. The vibration unit 50 includes a power switch 45 having a stem 42, a DC motor with offset counterweight 51 that is electrically connected to the power switch 45, at least one (1) battery 40, a battery receptacle 32 for receiving the battery 40 and which includes external recharging strips 30, a button enclosure 41, and a motor housing 46. The power switch 45 fits into the button enclosure 41 such that the stem 42 extends from the top of the button enclosure 41. The DC motor with offset counterweight 51 is received in the motor housing 46 which in turn snugly fits into the button enclosure 41. The battery receptacle 32 also receives part of the motor housing 46.

Except for the required electrical connections and electrical conductors, the battery receptacle 32, the button enclosure 41, and the motor housing 46 are envisioned as being made of a high temperature thermoplastic. The power switch 45 is envisioned as being a normally open (N.O.) spring loaded push-button switch that closes when the stem 42 is depressed, typically via thumb pressure. The power switch 45 is electrically connected at one terminal to the battery 40 and at the other terminal to the DC motor with offset counterweight 51. The battery 40 is preferably a rechargeable battery such as a MS920SE (3-Volt lithium rechargeable battery). Other types will also work. The DC motor with offset counterweight 51 can be a RadioShack®3 VDC Micro-Vibration Motor Catalog #: 2730107 or equal.

Figure 2:
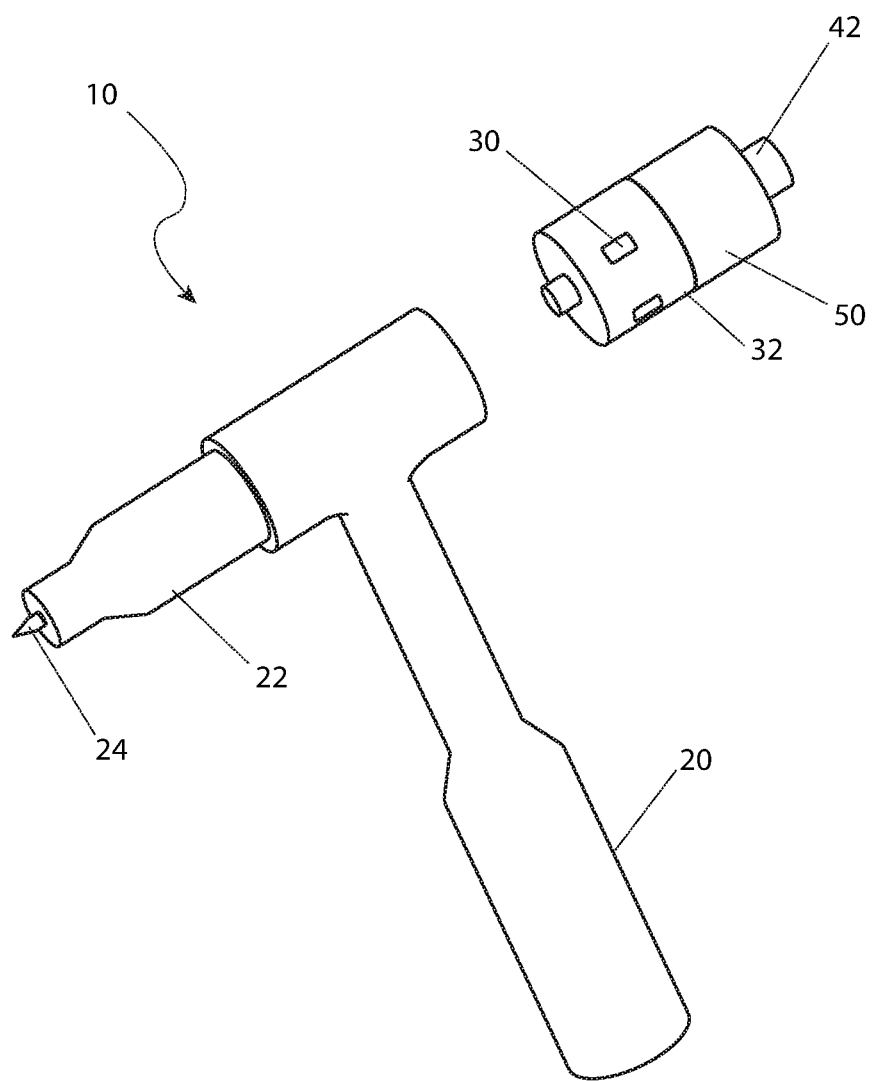
FIG. 2 is an exploded perspective view of a vibration welding system 10 shown in FIG. 1.

Still referring to FIG. 4, but also to FIG. 2 which is a view of the vibration welding system 10 with the vibration unit 50 removed from the torch body 20. In operation, when the power switch 45 is closed by pressure applied to the stem 42 by a welder's thumb electrical power from the battery 40 is applied to the DC motor with offset counterweight 51. This causes the DC motor with offset counterweight 51 to vibrate in the motor housing 46. Those vibrations are received by the button enclosure 41 and by the battery receptacle 32. The torch body 20 is configured to snugly receive the battery receptacle 32 of the vibration unit 50 such that induced vibrations are effectively transferred to the torch body 20 and from there onto the welding head 22 with its tungsten electrode 24. The induced vibrations can improve the quality of the resulting weld.

Figure 3:
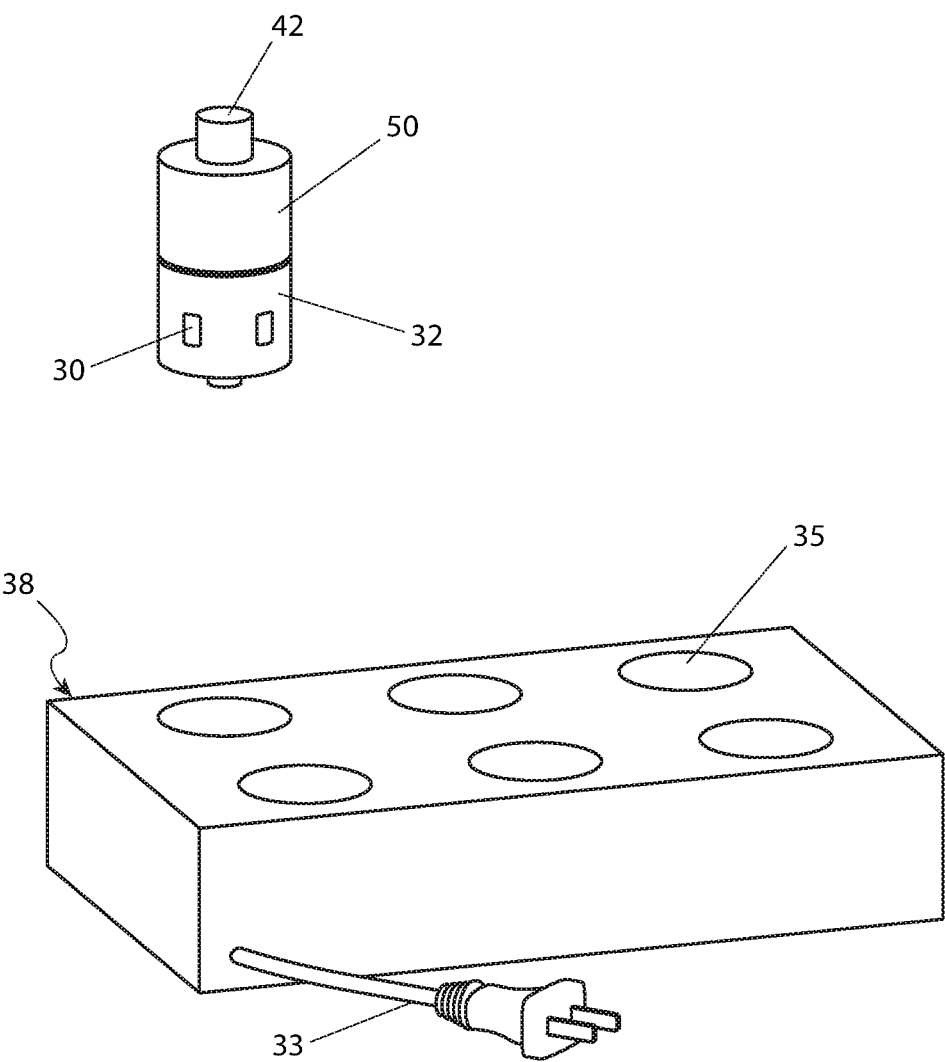
FIG. 3 is a perspective view a six receptacle recharging station 38 that is used with the vibration welding system 10 for recharging batteries.

As previously noted the battery 40 is rechargeable. To that end the vibration welding system 10 includes a recharging station 38 as shown in FIG. 3. The recharging station 38 receives power via an AC power cord 33. Also as noted the vibration unit 50 is removable. Removing the vibration unit 50 makes the battery receptacle 32 and its recharging strips 30 accessible. The battery 40 is recharged by inserting the battery receptacle 32 into a recharging receptacle 35 such that the recharging strips 30 mate with output contacts 80 (see FIG. 5 and the subsequent discussion) located in the recharging station 38. It is envisioned that the recharging station 38 will have multitude recharging receptacles 35 to enable recharging multiple rechargeable batteries 40 simultaneously. This would enable fully recharged batteries 40 to be available during prolonged TIG welding operations.

Figure 5:
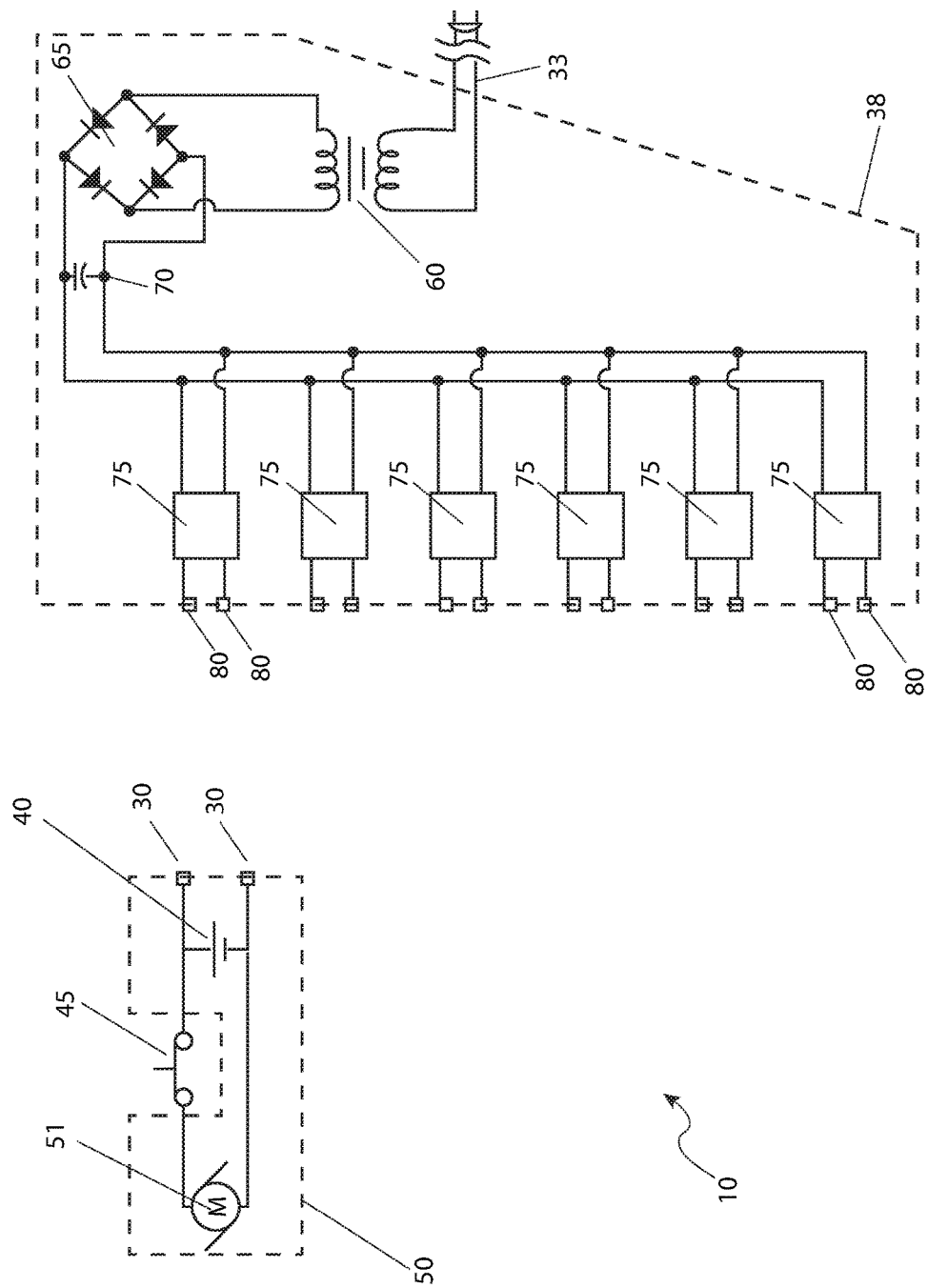

Refer now to FIG. 5 for a functional electrical block diagram of the vibration welding system 10. Power from the power cord 33 is routed to a transformer 60 located inside the recharging station 38. A reduced AC voltage from the transformer 60 is rectified by a rectifying bridge 65. The AC ripple on the rectifier output is filtered by a filter capacitor 70. The filtered DC voltage is distributed to six (6) independent charge regulators 75 to allow for independent recharging of the batteries 40. The output of the charge regulators 75 is directed to two (2) output contacts 80 within each recharging receptacle 35 (see FIG. 3). The output contacts 80 mate with the recharging strips 30.

Referring now back to FIG. 1, the vibration welding system 10 can be used for vibration assisted welding. For example, a base material 105 and a metal filler rod 101 may be used with the vibration welding system 10 to create a weld 110 between two (2) metal workpieces 100a and 100b. The welding head 22 energizes the tungsten electrode 24 which ionizes atmospheric gas and metal vapors creating an arc. The operator then depresses the stem 42 to close the power switch 45 which causes the tungsten electrode 24 to vibrate as explained above. Simultaneously the operator applies a metal filler rod 105 within the arc-space of the base material 105 via the seam 111 between the two (2) workpieces 100a, 100b. This melts the filler rod 101 into the base material 105 while the vibrations assist the welding process to make a good weld 110.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A vibration welding system, comprising:
   a tungsten inert gas (TIG) welding torch body;
   a welding head attached to said torch body;
   a tungsten electrode held by said welding head; and,
   a vibration unit attached to said torch body and which imparts vibrating motion to said tungsten electrode.

2. The vibration welding system according to claim 1, wherein said vibration unit includes a power switch extending from said vibration unit and which is accessible to a thumb of an operator.

3. The vibration welding system according to claim 1, wherein said vibration unit is removable from said torch body.

4. The vibration welding system according to claim 3, wherein said vibration unit includes a vibrator.

5. The vibration welding system according to claim 4, wherein said vibrator includes a DC motor with an offset counterweight.

6. The vibration welding system according to claim 5, wherein said vibration unit further includes a battery held in a battery receptacle.

7. The vibration welding system according to claim 6, wherein said battery receptacle includes external recharging strips in electrical communication with said battery.

8. The vibration welding system according to claim 6, wherein said DC motor is held within a motor housing.

9. A tungsten inert gas (TIG) welder, comprising:
   a tungsten inert gas (TIG) welding torch body;
   a welding head attached to said torch body;
   a tungsten electrode held by said welding head; and,
   a battery operated vibration unit attached to said torch body for imparting a vibrating motion to said tungsten electrode.

10. The tungsten inert gas (TIG) welder according to claim 9, wherein said vibration unit is removable from said torch body.

11. The tungsten inert gas (TIG) welder according to claim 9, wherein said vibration unit includes a switch housing, a battery receptacle, and a motor housing.

12. The tungsten inert gas (TIG) welder according to claim 11, wherein said switch housing retains a power switch having a stem that extends from the top of said vibration unit.

13. The tungsten inert gas (TIG) welder according to claim 12, wherein said battery receptacle retains a battery.

14. The vibration welding system according to claim 13, further including a battery charger for charging said battery.

15. The tungsten inert gas (TIG) welder according to claim 13, wherein said motor housing holds a vibrator.

16. The tungsten inert gas (TIG) welder according to claim 15, wherein said vibrator includes a DC motor.

17. The vibration welding system according to claim 16, wherein said DC motor includes an offset counterweight.

18. The tungsten inert gas (TIG) welder according to claim 16, wherein said battery receptacle includes external recharging strips in electrical communication with said battery.

19. The vibration welding system according to claim 18, wherein said motor housing at least partially fits inside said battery receptacle.

20. The vibration welding system according to claim 19, wherein said power switch selectively routes electrical power from said battery to said DC motor.

* * * * *